United States Patent

Seely

[15] 3,650,219

[45] Mar. 21, 1972

[54] RESILIENTLY SUPPORTED ARTICULATED RAILWAY VEHICLE

[72] Inventor: Robert M. Seely, Florissant, Mo.

[73] Assignee: General Steel Industries, Inc., St. Louis, Mo.

[22] Filed: Nov. 24, 1969

[21] Appl. No.: 879,082

[52] U.S. Cl. ................... 105/4 R, 105/159, 105/182 R, 105/197 A, 105/199 R, 105/208.1, 105/453, 217/75 R
[51] Int. Cl. ................... B61f 3/12, B61f 5/08, B61f 5/18
[58] Field of Search .............. 105/3, 4, 199, 453, 159, 182 R, 105/197 A, 199 R, 208, 1, 453; 267/3, 4; 213/75 R

[56] References Cited

UNITED STATES PATENTS

| | | | |
|---|---|---|---|
| 3,262,693 | 7/1966 | Hirst | 267/3 |
| 3,516,365 | 6/1970 | Lich | 105/182 R X |
| 3,521,569 | 7/1970 | Muotka et al. | 105/182 R |
| 3,523,505 | 8/1970 | Lich | 105/182 R |
| 2,132,001 | 10/1938 | Dean | 105/4 X |
| 2,225,242 | 12/1940 | VanDorn et al. | 105/453 |
| 2,268,318 | 12/1941 | Urbinati | 105/4 |
| 3,403,638 | 10/1968 | Hirst | 105/453 X |

Primary Examiner—Arthur L. La Point
Assistant Examiner—Howard Beltran
Attorney—Bedell and Burgess

[57] ABSTRACT

An articulated railway vehicle includes a truck having at least two wheeled axles, a truck frame supported on the axles, pairs of transversely spaced upright springs centered longitudinally of the truck and supported on the truck frame, a pair of body units aligned longitudinally of the truck and spaced apart longitudinally of the truck, elements projecting longitudinally from one of the body units and spaced apart transversely of the truck corresponding to the outer pair of springs and seated respectively thereon, and additional elements projecting longitudinally from the other body units and spaced apart transversely of the truck corresponding to the inner pair of springs and seated respectively thereon, the springs being distortable in shear generally longitudinally of the truck to accommodate relative swivel between the car bodies with each other and the truck, and transversely of the truck to cushion lateral forces. The bodies are connected to each other by a pivot structure above the center of the truck, which is connected to the truck frame to transmit longitudinal forces therebetween while accommodating relative swivel, transverse and vertical movements of the bodies with respect to the truck frame as are permitted by the springs.

17 Claims, 5 Drawing Figures

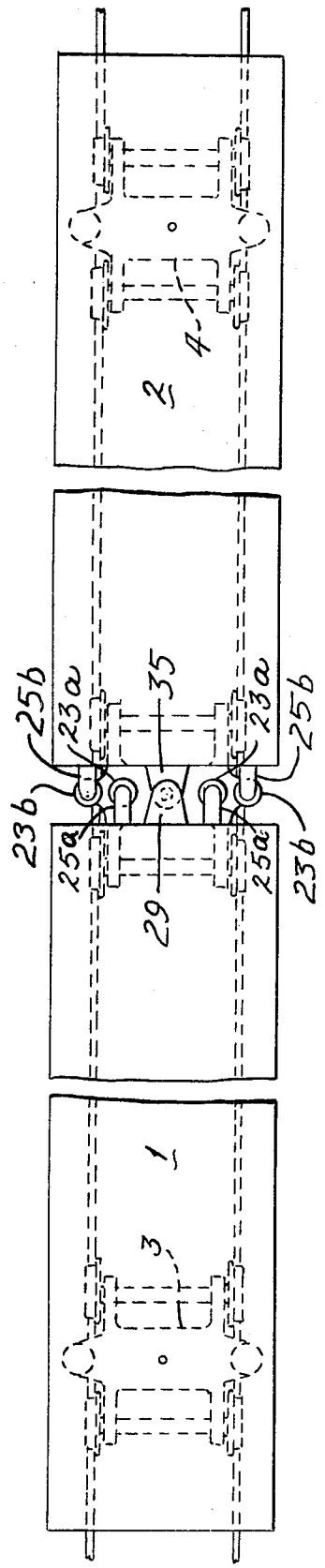
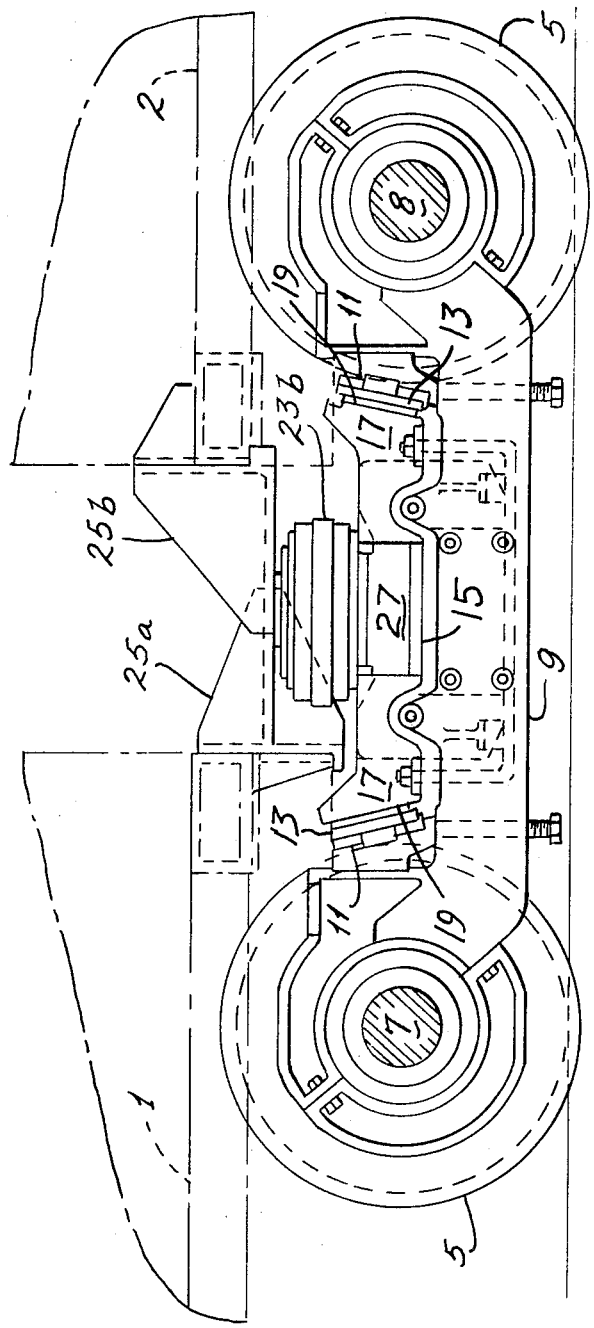

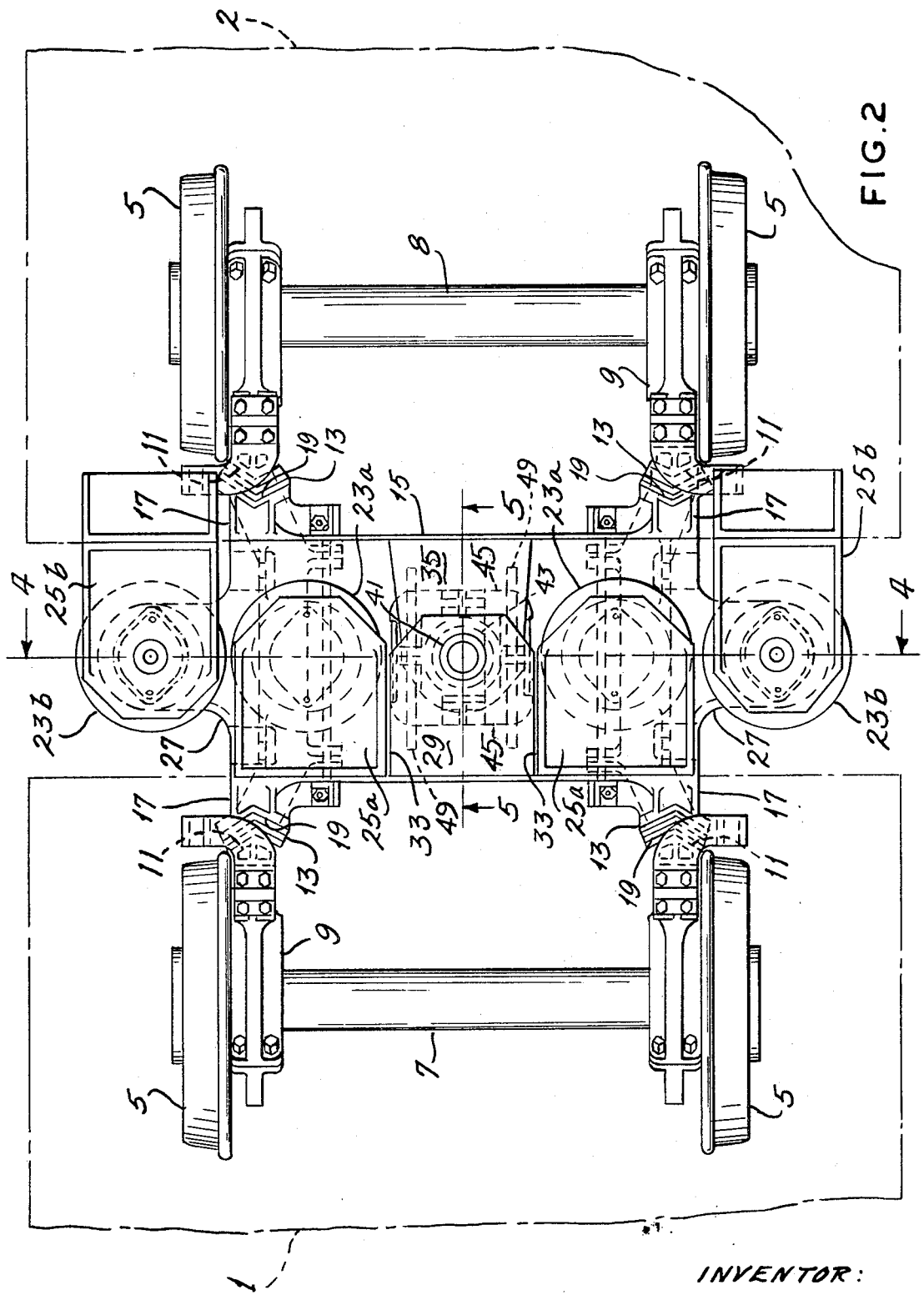

INVENTOR:
ROBERT M. SEELY
BY Bedell & Burgess
ATTORNEYS.

ations of the side
3,650,219

1

RESILIENTLY SUPPORTED ARTICULATED RAILWAY VEHICLE

BACKGROUND OF THE INVENTION:

Field of the Invention

The invention relates to railway rolling stock and consists particularly in an articulated railway vehicle of the type in which a single bolsterless truck supports a pair of adjacent car body units.

The Prior Art

Prior articulation arrangements have frequently utilized a truck in which a lateral motion bolster was supported from the truck frame and supported a central extension of one body unit by means of a center plate. A central extension of the other body unit was supported on the first body unit extension by a center plate. In common practice the first body unit had downwardly facing side bearings cooperable with truck mounted upwardly facing side bearings, and the second unit had downwardly facing side bearings cooperable with upwardly facing side bearings on the first unit.

SUMMARY OF THE INVENTION

The invention provides an articulated railway vehicle in which the truck at the articulation point is simplified and lightened by elimination of the conventional transverse load-supporting bolster, center plates and side bearings. This is achieved by supporting two pairs of upright springs which are capable of transverse and horizontal as well as vertical deflection in transversely spaced relation on the truck frame, and supporting one body unit on one pair of springs and the other body unit on the other pair of springs, and providing a direct vertical pivotal draft connection between the two body units above the center of the truck, and means connecting the latter to the truck frame to permit swivel, lateral and vertical movements of the body units with respect to the truck frame, while transmitting longitudinal movements (tractive and braking) direct between the truck frame and the body units.

BRIEF DESCRIPTION OF THE DRAWINGS:

FIG. 1 is a schematic plan view of a two-unit articulated car embodying the invention.

FIG. 2 is a detail plan view of the articulation connection between the body units, including the truck.

FIG. 3 is a side elevational view of the articulation connection illustrated in FIG. 2.

Figure 4:
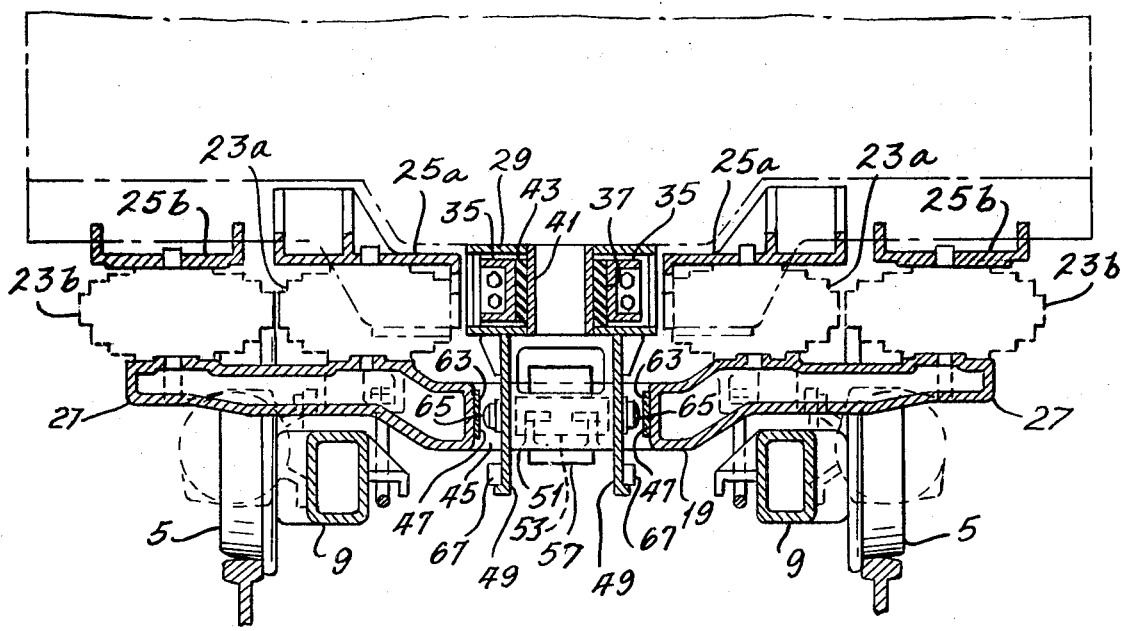
FIG. 4 is a transverse vertical sectional view along line 4—4 of FIG. 2.

DESCRIPTION OF THE PREFERRED EMBODIMENT:

Referring first to FIG. 1, a car embodying the invention comprises a pair of aligned elongated body units 1 and 2 supported at their remote ends respectively on swivel trucks 3 and 4 which may be of any type suitable for the class of service in which the car is to be utilized.

At their adjacent ends, body units 1 and 2 are supported on a truck comprising four railway flanged wheels 5 mounted in transversely spaced pairs on the ends of longitudinally spaced axles 7 and 8. Longitudinally extending transversely spaced side frames 9 are supported at their opposite ends on the ends of axles 7 and 8 and are provided longitudinally inwardly from the axles with transverse abutment surfaces 11 inclined outwardly and upwardly longitudinally of the truck. Surfaces 11 are of convex generally V-shape in plan and mount elastomeric pad devices 13 of the same configuration. A bolster or transverse frame 15 is formed with short longitudinal stubs 17 at each corner, and the latter terminate in transverse surfaces 19 of concave generally V-shape in plan and inclined parallel to side frame surfaces 11 for mounting on pad devices 13, whereby to permit side frames 9 to tip differentially longitudinally of the truck through shear in the pads, while resisting substantial longitudinal and transverse movements of the side frames and main frame 15 with respect to each other.

For supporting body unit 1, main frame 15 mounts, transversely inwardly of wheels 5 on the transverse center line of the truck, a pair of elastomeric upright springs 23a of a type which is yieldable horizontally, both transversely and longitudinally of the truck, as well as vertically, and body unit 1 is provided with rigid longitudinal projections 25 which rest on the top of springs 23a and are secured thereto so that vertical and lateral cushioning of body unit 1 are obtained respectively by the vertical and transverse resiliency of springs 23a while swivel of the truck relative to underframe 1 is accommodated by horizontal yielding of springs 25 in opposite directions along arcs generally longitudinal of the truck.

For supporting body unit 2, main frame 15 is formed with a pair of outboard extensions 27 centrally located longitudinally of the truck, and a pair of elastomeric upright springs 23b are seated on extensions 27. Body unit 2 is provided with rigid longitudinal projections 25b, which rest on the top of and are secured to springs 23b, which function the same with respect to body unit 2 as do springs 23a with respect to body unit 1.

Figure 5:
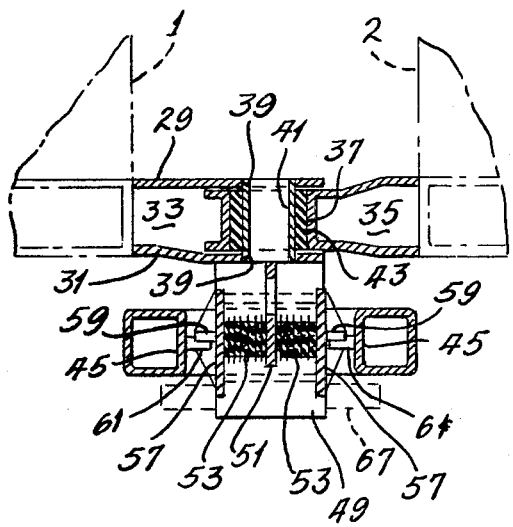
FIG. 5 is a partial longitudinal vertical sectional view along line 5—5 of FIG. 2.

For coupling body units 1 and 2 to each other and transmitting longitudinal (acceleration and retardation) forces between them and the truck, at its center, body unit 1 has a longitudinal projection of rectangular cross section having vertically spaced top and bottom walls 29 and 31 and transversely spaced side walls, as best seen in FIGS. 2 and 5, and body unit 2 has a mating central longitudinal projection 35, the outer end of which is cylindrically apertured as at 37 and extends into the open outer end of body unit 1 projection 29, 31, 33, top and bottom walls 29 and 31 of which are formed with vertically aligned holes 39 concentric with but smaller than projection 35 aperture 37. A vertical tube 41 extends through holes 39 and aperture 37 and is secured to top and bottom walls 29 and 31 of the body unit 1 projection, and an elastomeric bushing 43 is compressed into the annular space between tube 41 and the wall of projection 35 aperture 37 to accommodate relative angling movements of the two body unit projections in the vertical plane caused by vertical track curvature and differential transverse inclinations of the body units. Relative angling of the body units caused by horizontal track curvature are accommodated by circumferential shear in bushing 43. For transmitting longitudinal forces between the truck and the body units, at its center, truck main frame 19 is formed with a generally rectangular aperture defined by longitudinally spaced transverse walls 45 and transversely spaced longitudinal walls 47, and a pair of transversely spaced longitudinal vertical webs 49 rigid with body unit 1 bottom wall 31 depend therefrom into and through aperture 45, 47 in which they are spaced both from aperture side walls 47 and transverse walls 45. Intermediate the vertical edges of webs 49, a transverse vertical web 51 connects them and a draft transmitting device comprising a pair of precompressed elastomeric pad devices 53 is interposed between the opposite transverse surfaces of web 51 and transverse webs 45 of the truck main frame. The longitudinal outer ends of pad devices 53, each of which consists of a plurality of flat transverse vertical elastomeric pads bonded to and interleaved by flat metal plates, are secured to transverse mounting plates 57. The latter are formed with rearwardly extending transverse horizontal ribs 59, by which they are rigidly mounted on horizontal brackets 61 formed on truck frame aperture transverse walls 45, so that lateral and vertical movements of body units 1 and 2 on their supporting springs 23a and 23b are accommodated by transverse and vertical shear in pad devices 53, and swivel movements of the truck relative to the body units is accommodated by a combination of shear and compression of the pad devices. Longitudinal forces are transmitted substantially direct between the truck and both body units by the resistance of pad devices 53 to compression longitudinally of the truck and the resistance of bushing 43 to radial compression.

For limiting the amount of lateral movement of the body units with respect to the truck, side walls 47 defining the truck frame aperture mount wear plates 63, and the outer surfaces of webs 49 mount laterally outwardly facing resilient elastomeric bumpers 65 which are spaced transversely from wear plates 63 a sufficient distance to permit the desired amount of lateral movement.

For preventing vertical separation of the truck from the body units, webs 49 both mount, along their lower margins, longitudinally extending bars 67, the end portions of which underlie the bottom of main frame 19 fore and aft of the apertures therein defined by transverse walls 45.

I claim

1. In a railway vehicle, body structure comprising a pair of elongated body units arranged in end-to-end relation, a truck underlying the adjacent ends of said body units, said truck comprising a pair of wheeled axles spaced apart longitudinally of the truck, framing supported thereon, a first pair of upright springs mounted on said truck framing and spaced apart transversely thereof, a second pair of springs mounted on said truck framing transversely inboard of and in operational parallel with said first pair of springs, all of said springs being located substantially midway between said axles, means mounting one of said body units on said first pair of springs, and additional means mounting the other body unit on said second pair of springs, said mounting means holding the two body units against horizontal movements relative to their respective mounting springs, said springs forming the sole support of said body units on the truck and being horizontally yieldable generally longitudinally of the vehicle to accommodate horizontal angling of said body units with respect to each other and to said truck.

2. In a railway vehicle according to claim 1, draft transmitting means connecting said body units to each other and to said truck.

3. In a railway vehicle according to claim 2, said draft transmitting means comprising a vertical axis pivotal connection between said body units substantially at the center of said truck.

4. In a railway vehicle according to claim 3, said draft transmitting means comprising a longitudinal force transmitting connection between said body structure and said truck framing.

5. In a railway vehicle according to claim 1, said body units being spaced apart longitudinally of said truck, said means mounting said body units on said springs comprising a pair of transversely spaced longitudinal extensions from the end of each said body unit toward the other body unit, said extensions being secured to the tops of the respective springs.

6. In a railway vehicle according to claim 5, draft transmitting means including elements projecting longitudinally from each body unit toward the other body unit and pivotally connecting said body units to each other on a vertical axis substantially at the center of said truck.

7. In a railway vehicle according to claim 6, a draft transmitting device connecting one of said projecting draft transmitting elements to said truck.

8. In a railway vehicle according to claim 6, said draft transmitting elements being at a higher level then said truck framing, one of said draft transmitting elements being formed with a member depending to the level of said truck framing substantially at the center of said truck and there having a longitudinal force transmitting connection with said truck framing, said last-named connection permitting relative vertical, lateral and swivel movements of said depending member and said truck framing with respect to each other.

9. In a railway vehicle according to claim 6, said draft transmitting elements being formed respectively with a vertical cylindrical aperture and a mating cylindrical element pivotally received therein.

10. In a railway vehicle according to claim 9, a bushing of resilient material surrounding said cylindrical element within said cylindrical aperture whereby to accommodate differential tipping movements of said body units longitudinally and transversely of the vehicle.

11. In a railway vehicle according to claim 9, said draft transmitting element formed with said cylindrical element having vertically spaced top and bottom webs connected by said cylindrical element, said draft transmitting element formed with said cylindrical aperture being received between said top and bottom webs of said other draft transmitting element.

12. In a railway vehicle according to claim 11, a post aligned vertically with said cylindrical element depending from said draft transmitting element bottom web, and means swivelly connecting said post to said truck framing.

13. In a railway vehicle according to claim 12, said truck framing having longitudinally spaced opposing transverse surfaces symmetrically disposed with respect to the truck center and defining an aperture through said framing, said post projecting into said aperture, said swivelly connecting means being positioned between said post and said transverse surfaces.

14. In a railway vehicle according to claim 13, said swivel connecting means comprising flat transverse elastomeric pad devices compressed between both transverse surfaces of said post and the respectively opposed transverse surfaces of said truck framing.

15. In a railway vehicle according to claim 1, said truck framing including a rigid transverse frame, there being means resiliently supporting said rigid frame from said axles.

16. In a railway vehicle according to claim 15, said frame having lateral outboard extensions at each side intermediate said wheels, one of said pairs of springs being supported on said extensions, said other pairs of springs being supported on said frame transversely inwardly of said extensions.

17. Railway vehicle truck structure comprising a pair of wheeled axles spaced apart longitudinally of the truck structure, framing supported thereon, first and second pairs of transversely spaced upright springs carried by said framing substantially midway between said axles and spaced apart transversely thereof, body support elements fixed to and carried by said first pair of springs and extending in one direction longitudinally of the truck therefrom, additional body support elements fixed to and carried by said second pair of springs and extending in the opposite direction longitudinally of the truck therefrom, said framing having longitudinally spaced opposing transverse surfaces defining an aperture at its center, a vertical post positioned within said aperture, transverse elastomeric pad devices compressed between transverse surfaces of said post and opposing transverse surfaces of said framing, a body draft element rigidly secured to said post above said truck framing, and a second body draft element pivotally secured to said first draft element on a vertical axis aligned with said post.

* * * * *